US008774187B2

(12) United States Patent
Hartman (10) Patent No.: US 8,774,187 B2
(45) Date of Patent: Jul. 8, 2014

(54) METHODS, SYSTEMS, AND DEVICES FOR INTERFACING TO NETWORKS

(76) Inventor: Richard L. Hartman, Spokane, WA (US)

( * ) Notice: Subject to any disclaimer, the term of this patent is extended or adjusted under 35 U.S.C. 154(b) by 0 days.

(21) Appl. No.: 13/280,257

(22) Filed: Oct. 24, 2011

(65) Prior Publication Data

US 2013/0100963 A1 Apr. 25, 2013

(51) Int. Cl.
*H04L 12/28* (2006.01)

(52) U.S. Cl.
USPC .......................................... 370/392; 370/429

(58) Field of Classification Search
USPC .......... 370/401, 419, 420, 463, 464, 465, 469
See application file for complete search history.

(56) References Cited

U.S. PATENT DOCUMENTS

| | | | |
|---|---|---|---|
| 5,640,399 A | 6/1997 | Rostoker | |
| 5,778,180 A | 7/1998 | Gentry | |
| 6,108,345 A * | 8/2000 | Zhang | 370/445 |
| 6,112,252 A | 8/2000 | Hausman | |
| 6,240,533 B1 * | 5/2001 | Slemmer | 714/48 |
| 6,788,647 B1 * | 9/2004 | Mohaban et al. | 370/235 |
| 7,103,322 B2 * | 9/2006 | Jones et al. | 455/90.3 |
| 7,197,045 B2 | 3/2007 | Amit | |
| 7,366,179 B2 * | 4/2008 | McElroy et al. | 370/395.5 |
| 7,496,955 B2 * | 2/2009 | Akundi et al. | 726/11 |
| 7,505,408 B1 * | 3/2009 | Mohaban et al. | 370/235 |
| 7,515,603 B2 * | 4/2009 | Courteille et al. | 370/463 |
| 7,545,828 B2 * | 6/2009 | Herron | 370/466 |
| 7,573,898 B2 * | 8/2009 | Burrell et al. | 370/463 |
| 7,624,431 B2 * | 11/2009 | Cox et al. | 726/4 |
| 7,712,130 B2 * | 5/2010 | Reamer | 726/11 |
| 7,805,535 B2 * | 9/2010 | Narsinh et al. | 709/232 |
| 7,941,837 B1 * | 5/2011 | Jiang et al. | 726/11 |
| 8,195,989 B1 * | 6/2012 | Lu et al. | 714/56 |
| 8,249,082 B2 * | 8/2012 | DelRegno et al. | 370/400 |
| 8,249,099 B2 * | 8/2012 | Agarwal et al. | 370/465 |
| 8,693,466 B2 * | 4/2014 | Johnson | 370/356 |
| 8,693,473 B2 * | 4/2014 | Harjanto et al. | 370/389 |
| 2003/0229780 A1 * | 12/2003 | Reamer | 713/153 |
| 2008/0062991 A1 | 3/2008 | Kumar | |
| 2008/0240103 A1 | 10/2008 | Schmidt | |

OTHER PUBLICATIONS

Product brief for Vitesse VSC7501, "4+2-Port Router-on-a-C hip Switch", 2007.
Specification sheet for Advanced Micro Devices AM79C971, "Single-chip 10/100 MBPS PCI Ethernet Controller With Integrated PHY", 2000.
Specification sheet for Advanced Micro Devices AM79C973, "Single-Chip 10/100 MBPS PCI Ethernet Controller with Integrated PHY", 2000.

(Continued)

*Primary Examiner* — Brian O'Connor
(74) *Attorney, Agent, or Firm* — Wells St. John P.S.

(57) ABSTRACT

Systems, methods, and devices for network communication are described. According to one embodiment, a system for connecting to communication networks includes a host configured to support at least a first bidirectional network interface and a second bidirectional network interface. The system also includes a first network interface connected to the host, the first network interface's input configured to receive incoming data from a first network connection and its output configured to transmit outgoing data to a second network connection. The system further includes a second network interface connected to the host, the second network interface's input configured to receive incoming data from the second network connection and its output configured to transmit outgoing data to the first network connection.

8 Claims, 9 Drawing Sheets

(56) References Cited

OTHER PUBLICATIONS

Specification sheet for Microchip ENC28J60, "Standalone Ethernet Controller", 2004.

Specification sheet for NXP LPC2378, "Single chip 16/32 bit microcontrollers", 2011.

Specification sheet for SMSC LAN9118, "High-Performance 32-Bit Single Chip 10/100 Non-PCI Ethernet Controller", 2008.

* cited by examiner

METHODS, SYSTEMS, AND DEVICES FOR INTERFACING TO NETWORKS

TECHNICAL FIELD

This disclosure relates to the field of electronic communication networks, especially those devices in which high-speed network communication must be achieved at low cost.

BACKGROUND OF THE INVENTION

Electronic communication networks, and devices which utilize them, have become commonplace both in industry and in home environments. Once the sole province of laboratory grade computing equipment, networks interfaces are now found in a broad spectrum of everyday devices including personal computers, children's handheld games, in-the-field data acquisition equipment, portable music players, and more.

To communicate on a network, a device requires an interface that can translate and navigate the specific signals and protocols of that network. As such interfaces have become more prevalent, manufacturers have created increasingly integrated solutions. In some cases, interfaces that once required entire dedicated printed circuit boards full of components are now often available as a single component or "chip", and even as subsections of larger chips.

Such chips benefit from the well-known economies of scale in the semiconductor industry, yielding dramatic reductions of cost and physical space necessary to add network interfaces to any given device or product. As just one example, to implement an "Ethernet" interface once required parts costing many dollars and perhaps ten square inches of printed circuit board space. As of this writing, that same Ethernet interface is widely available as a standalone integrated circuit (IC) that consumes only a fraction of a square inch at a fraction of the cost. Indeed, if the interface circuitry is included in another integrated circuit already in the system, it is possible to include network support with essentially zero additional overhead.

As with other aspects of the electronics industry, networks continue to advance and improve. The most obvious improvement is data rate: the amount of data that can be transferred over the network per unit time. Whereas a few hundred kilobits per second was considered state of the art just a few years ago, today single-chip interfaces are commonly available that support tens of gigabits per second. Meanwhile, the cost of the interface IC—and thus the expense of including network connectivity—has remained relatively constant. As there is essentially no cost penalty (and significant engineering and marketing advantages) for supporting the fastest and latest networks, most devices simply incorporate the latest generation of network interface IC's with every update and revision.

In most devices, and particularly lower cost products, available network bandwidth now far exceeds the capacity of the host electronics. The microprocessor or other host circuitry cannot keep up with a real-time network data rate of 100 megabits per second (Mbps), 1000 Mbps, and more (analogous to 10-100 megabytes per second). Microcontroller and microprocessor data buses often cannot support such data rates, and the processing cores and other computational components could not do useful work at those rates even if the data could be brought on and off chip. So while the network interface IC may be able to accommodate modern network data rates, its host interface is slowed by the limitations of the host electronics.

Importantly, this throughput limitation is not a problem for those devices needing just a single network connection (or "port") to connect to a single network. The interface IC sits between the network medium (cable, fiber, etc.) and the host device electronics (microprocessor or other circuitry), translating between the faster network signals on one side and the slower host circuitry on the other. In a single-port device, the host circuitry is the endpoint—the ultimate consumer of the network data—so any limitations it imposes on network interface IC throughput have no ripple effect beyond the device itself. The device's designers select host circuitry based on the intended functionality; more host circuitry speed if the overall device is intended to "do more", and less speed if less work is required. As long as the network interface IC can transfer data to and from the network at the speeds required by the host circuitry, then the effective network speed—and the network interface IC—is "fast enough."

In a single port device, then, the choice of host circuitry is driven by the task the device is meant to perform, and not by the peak throughput of the network to which the device will be connected. A device meant to perform a relatively simple or infrequent task can use very simple, very inexpensive host circuitry with its network interface IC. A device intended to do more complex, or more frequent work might incorporate faster and more expensive host circuitry with the same network interface IC. The throughput of the single network port and the network interface IC behind it is automatically and naturally determined by the needs and capabilities of the host circuitry using the network data.

This tidy relationship breaks down, however, when multiple network ports are involved. Consider a device with two network ports, where the task is to move data between the two connected networks while optionally performing some processing on the data. Examples include network infrastructure devices such as routers, firewalls, bridges, and protocol adapters; data sensing and remoting networks such as digital audio "snakes" and building/lighting/HVAC modules; production line process control systems; and countless others. Such devices transfer data between networks while analyzing, acting upon, and in some cases altering portions of the data to control upstream or downstream behavior.

In such multi-port devices, the majority of the data is transited verbatim from one port, through the device, to another port. Small percentages may be analyzed, and if warranted the same or other small sections may be altered by the device, but otherwise the bulk of the data is unchanged and passed along without requiring the attention of the device's host circuitry.

The key difference between single and multi-port devices is that their internal host circuitry is no longer the endpoint for network data. Any data being transited by the device from one port to another is, by definition, intended for other devices—and the throughput requirements of those other devices may far exceed those of the multi-port device's own host circuitry.

Unfortunately, this conflicts with the tidy relationship described above where the throughput requirements of the device's host circuitry define the throughput requirements of the device as a whole. In a multi-port device, the effects of its throughput limitations are not limited to itself; they are also imposed upon the connected networks and all other devices connected to them.

Returning to our two port device example: if it has two 100 Mbps ports but can only transit data at a maximum of 5 Mbps due to cost-efficient but slow internal host circuitry, that 5 Mbps limitation will be imposed upon all data passing between the two networks. Its network interface IC's may well be capable of handling the full 100 Mbps, but the host circuitry between those two interface IC's simply cannot sustain the throughput. The two-port device is thus a severe bottleneck in an otherwise high-speed environment. The classic example of a soda straw connecting two firehoses is particularly illustrative.

Earlier attempts to solve this problem have met with mixed results. Some prior art simply increases the host circuitry's capacity such that it can sustain the full network bandwidth. Essentially, the entire system is made fast enough by brute force. Doing so, however, dramatically increases the cost of the entire device for no benefit other than network throughput.

Another approach seen in prior art adds dedicated, high-speed Direct Memory Access (DMA) circuitry to the host to handle the transfer of data to and from the network interface IC's. This permits the original, simpler host circuitry to remain relatively unmodified. However, to support high-speed data movement between the network interface IC's there must be high-speed data buses and their attendant support devices, which add cost and design complexity to the host circuitry. The additional DMA hardware further increases cost, complexity, power consumption, and heat dissipation. The memory itself must be made fast enough to sustain the data rate, and in some cases expensive and complicated dual-port memories must be used. The original host circuitry must also be able to interface to the high-speed data buses and faster memory, leading to even greater cost increases and once again altering the design goals of the device.

It is clear that the need exists for high-speed network support on multi-port devices while maintaining minimal cost and complexity. Multi-port networked devices are manufactured and sold by the tens of millions annually worldwide. Cost-to-build is exceptionally important. Other considerations such as power consumption and heat dissipation also warrant concern as energy costs and environmental impacts become ever more significant. Small increases or reductions in per-device cost, power, and heat can have extraordinary multiplicative effects. An invention that enables high-speed networking while lowering cost, complexity, power, and heat would be extraordinarily important and valuable.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

For clarity, the accompanying Figures show a network interface's Physical (PHY), Media Access Control (MAC), Buffer (BUF), and Interface (INT) functional blocks grouped in various ways. Those of ordinary skill in the art will recognize that the network interface's style and degree of integration varies with different network media, circuit designs and architectures, construction and assembly procedures, integrated circuits, manufacturers, and many other variables. The new techniques and advantages of this invention are not restricted to any specific implementation and other variations and derivations are explicitly included.

Figure 1:
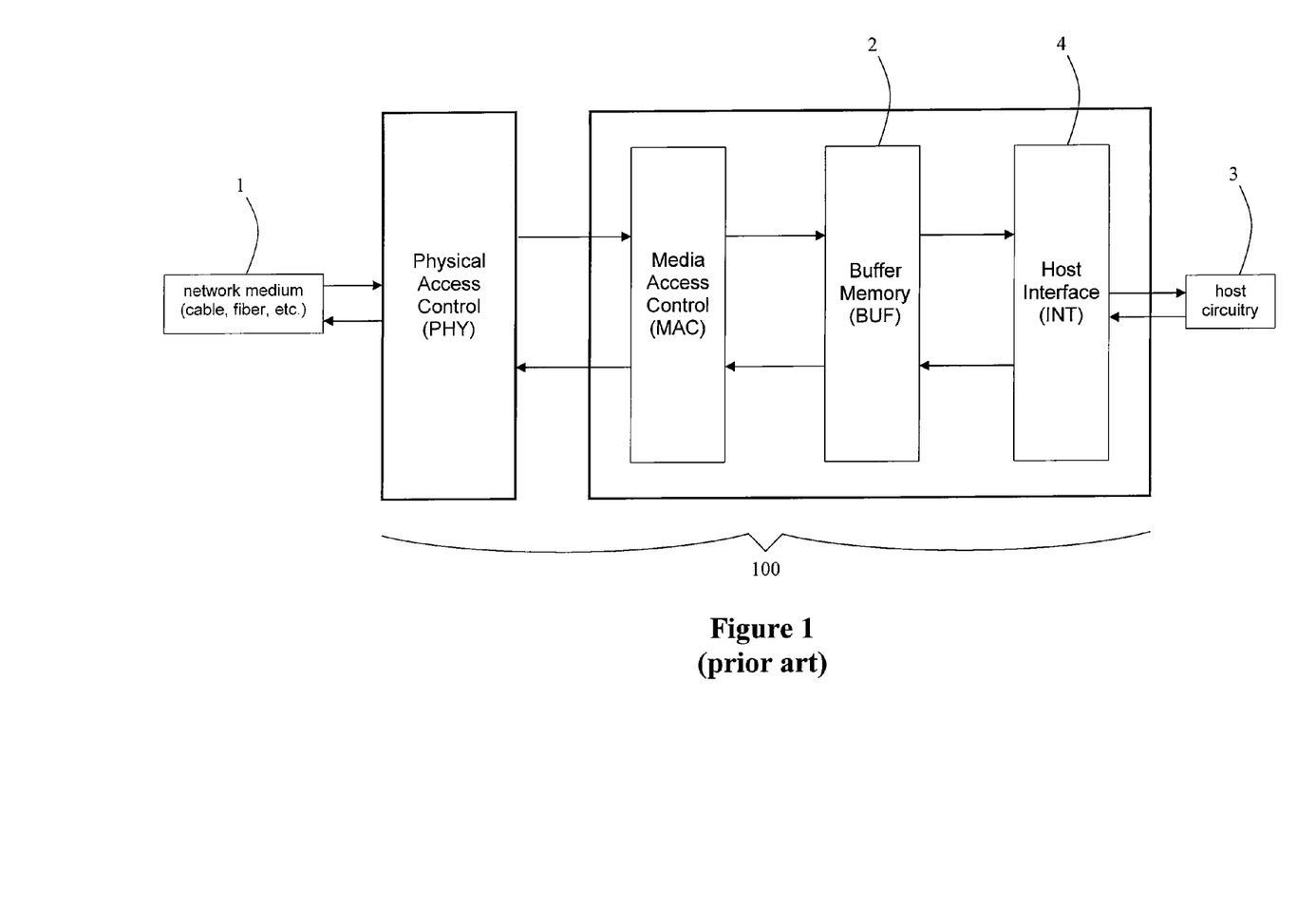
FIG. 1 is a block diagram of a generic network interface according to one embodiment.

FIG. 1 is a block diagram of a known network interface 100. Such interfaces can be implemented as printed circuit boards, standalone integrated circuits (IC's), subsections of other components such as application specific integrated circuits (ASIC's), gate arrays, microcontrollers and microprocessors, and other implementations. Some designs keep the Physical Access Control (PHY) portion separate from the rest of the interface, while others combine them into a single component. The network interface 100 sits between host circuitry 3 and a network medium 1 (fiber, twisted pair, coaxial cable, RF/wireless, etc.).

Data to or from network medium 1 passes through the various functional blocks of network interface 100. Buffer memory 2 plays a key role by accommodating speed differences between network medium 1 and host circuitry 3.

During reception from network medium 1, data is transferred from network medium 1 to buffer memory 2. When a threshold is reached, host circuitry 3 is notified via a host interface 4 that a complete data assembly (often called a "packet") is available. Host circuitry 3 can then read the received data from buffer memory 2 and act upon it.

During transmission to network medium 1, data is transferred from host circuitry 3 to buffer memory 2. When sufficient data has been written (often a complete packet), network interface 100 transmits the data in its buffer on network medium 1.

Transmitting and receiving data on network medium 1 can occur at very high speeds. To comply with network timing requirements, individual binary bits may need to be transferred onto network medium 1 every few nanoseconds. Most host circuitry 3 cannot sustain transactions at that rate; it is instead better suited to moving larger amounts of data in discontinuous "bursts." Buffer memory 2 within the network interface makes it possible to convert between the network's "continuous stream of smaller numbers of bits" and the host's "infrequent bursts of larger number of bits."

The network interface of FIG. 1 internally handles the full speed conversion of data between network medium 1 and buffer memory 2. Data can be received from the network as long as room exists within the buffer. However, the buffer is not infinitely large. Host circuitry 3 must read received data from buffer memory 2 and thus make that space available for newly received data, in a timely fashion, or further received data will be lost for lack of buffer memory to store it.

Likewise, data can be transmitted to network medium 1 as long as host data is available from buffer memory 2. However, if host circuitry 3 does not continue to write data into buffer memory 2 at a rate sufficient to keep up with the network speed, that opportunity to transmit data on network medium 1 will be lost as the network interface of FIG. 1 starves for lack of data to transmit.

It is clear from the above that the speed of host circuitry 3 can directly affect utilization of a given network port. If host circuitry 3 cannot keep up with the network's transmit and receive speeds—if it cannot move data to and from buffer memory 2 fast enough—the real data throughput of the network port is reduced.

Figure 2:
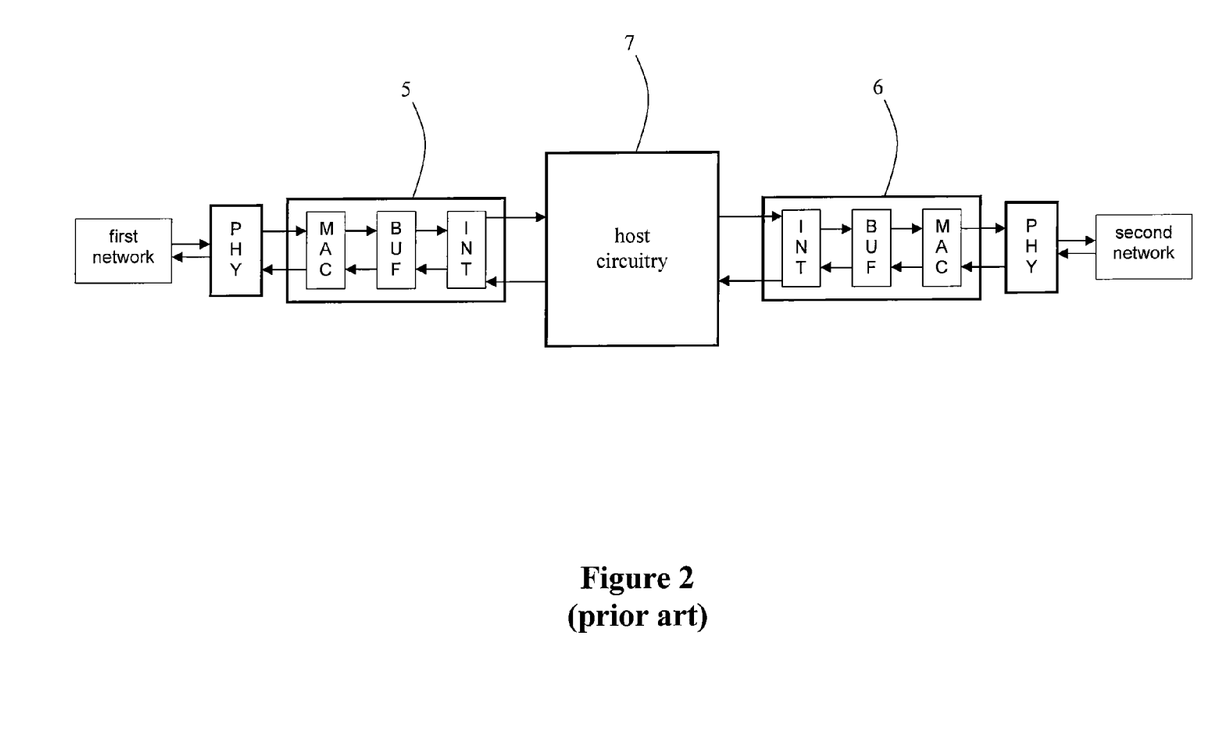
FIG. 2 illustrates a traditionally configured network-connected device with host circuitry and two network interfaces according to one embodiment.

This effect becomes even more dire on devices with multiple network ports. FIG. 2 illustrates a device with two network interfaces. Each network interface handles both receive and transmit for a single, common network connection in keeping with traditional architectures well known to those skilled in the art. Both network interfaces 5 and 6 connect to host circuitry 7, which must now attempt to keep up with potentially twice the data flow of the example described above. This data-movement workload is in addition to whatever other tasks host circuitry 7 is responsible for performing.

Figure 3:
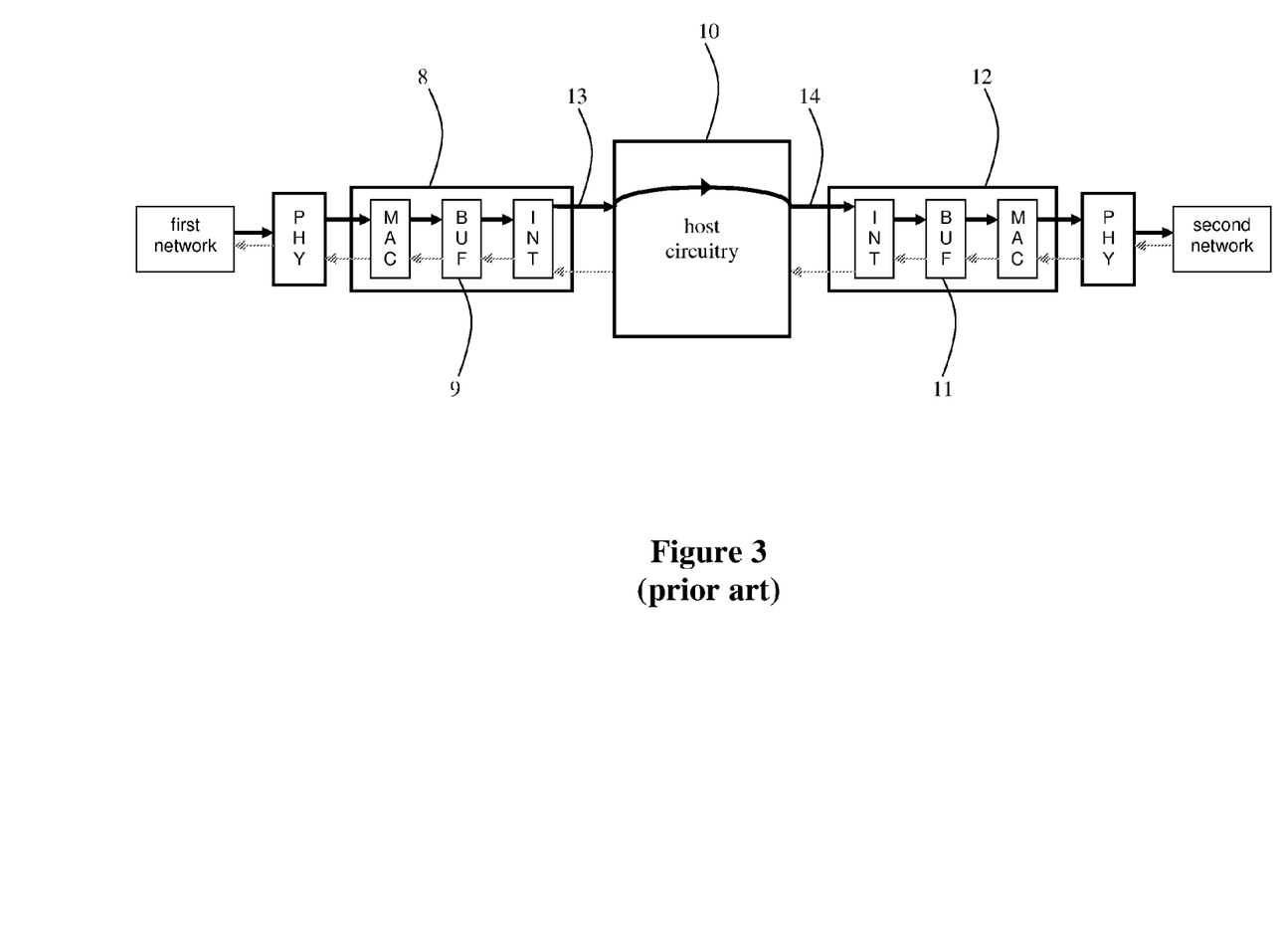
FIG. 3 illustrates the data flow of the device in FIG. 2 from a first connected network to a second connected network in a traditionally configured network-connected device according to one embodiment.

FIG. 3 illustrates the case of data being received from a first network, which is to be forwarded to a second network. The resulting traditional data path through the device is shown by FIG. 3's bolded arrows. Network interface 8 receives a packet from the first network and makes it available in its buffer 9, all at full network speed. Host circuitry 10 must then read the packet from the network interface 8's buffer 9 into its own memory, perform any analysis or modification that may be required, and write the results into the second network interface 12's buffer 11. Only then can network interface 12 begin transmitting the packet; once started it can do so at full network speed, but transmission cannot begin until host circuitry 10 writes the complete packet into buffer 11.

Bottlenecks may occur at the connection 13 between the network interface 8 and host circuitry 10, and connection 14 between host circuitry 10 and network interface 12. Reading from and writing to network interfaces 8 and 12 is limited by the speed of connections 13 and 14, which are in turn limited by host circuitry 10. Often the network interfaces are connected to the host circuitry's "data bus," parallel data connections that act synchronously to transfer some number of data bits (often 8, 16, or 32). But even with wide data buses, host circuitry 10 often cannot transfer entire packets out of buffer 9, into the host 10's own memory, and thence into buffer 11 without falling behind.

Again, the network interfaces themselves are generally able to sustain full network speeds. The slowdown is caused by the host circuitry moving the network data from one network interface to the other.

In the case of microprocessor based host circuitry, too many instruction cycles are required to move entire packets around at full network speeds—let alone do any analysis or modification of those packets before forwarding them. Some improvement is possible with hardware assisted reads and writes such as the aforementioned DMA. However the DMA hardware, and the data bus, and all associated components must be fast (read: expensive) enough to sustain full network speed. And if any host analysis or modification of the packet is desired, the host circuitry must still be involved and its inherent speed limitations still imposed upon both network interfaces and, hence, both networks.

Figure 4:
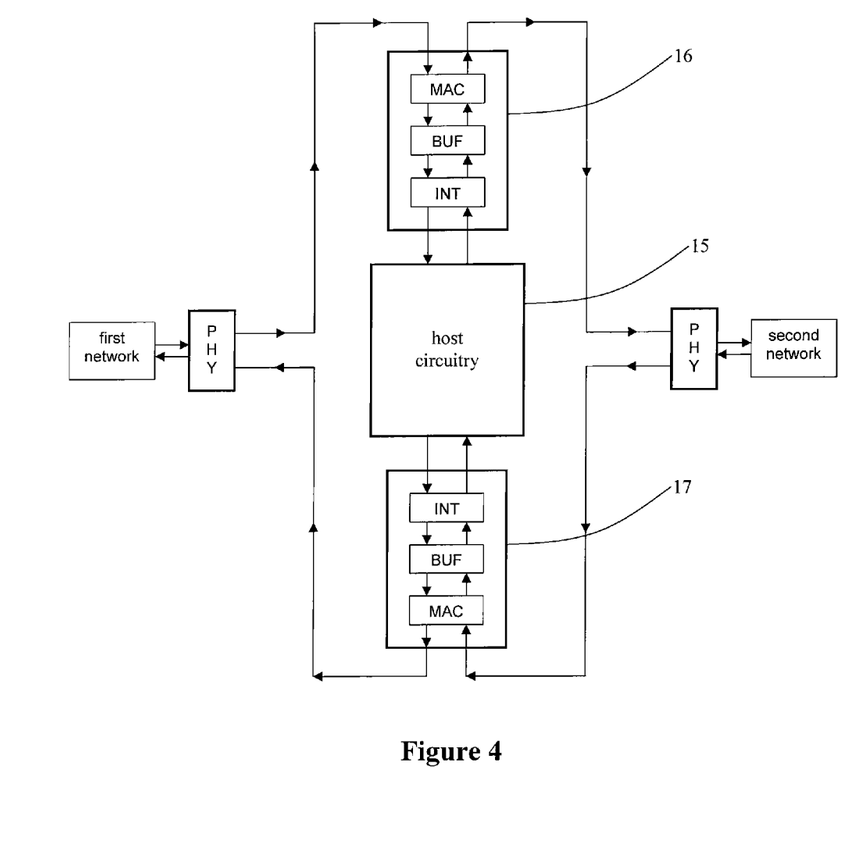
FIG. 4 illustrates a network-connected device using the same components as in FIG. 2, but with the host circuitry and network interfaces in an improved configuration as compared to FIG. 2 according to one embodiment of the invention.

FIG. 4 illustrates one embodiment of the current invention, shown as a modification to the known architecture depicted earlier in FIG. 2.

As with the device in FIG. 2, the device in FIG. 4 includes host circuitry 15 and two network connections implemented by two network interfaces 16 and 17. In FIG. 2, each network interface handles a single network in the manner well known to those skilled in the art. In the current invention the same basic components can be used. But unlike traditional networked devices such as that shown in FIG. 2 where a single network interface handles both transmit and receive for a single network connection, in FIG. 4 the current invention configures network interfaces to optimize efficiency of data flow.

A key advantage of FIG. 4's embodiment of the current invention is that it can use the same components as the traditional architecture of FIG. 2. The host circuitry 7 of FIG. 2 can be the same as the host circuitry 15 of FIG. 4, and the network interfaces 5 and 6 of FIG. 2 can be the same as the network interfaces 16 and 17 of FIG. 4.

The ability to achieve FIG. 4's embodiment of the current invention with the components in FIG. 2's traditional architecture can be visualized by rotating FIG. 2 ninety degrees clockwise, and then reconfiguring the connections to each network's PHY modules (for clarity, the PHY modules are shown as external components in these examples). The result is FIG. 4—a radical departure from the norm of FIG. 2, one that delivers enormous efficiency improvements, yet can do so with the same basic components.

In traditional architectures, a single network interface with its internal buffer handles both the receive and transmit data paths to a common network connection. This well-known arrangement has been easy to describe, easy to understand, and easy to implement.

To deliver its advantages, the current invention departs radically from this historical norm by "splitting" a single network interface across two network connections, receiving from one and transmitting to the other. By configuring traditional network interfaces in this nontraditional and nonobvious manner, the current invention enables a single network interface to efficiently handle a whole data path through a networked device.

Figure 5:
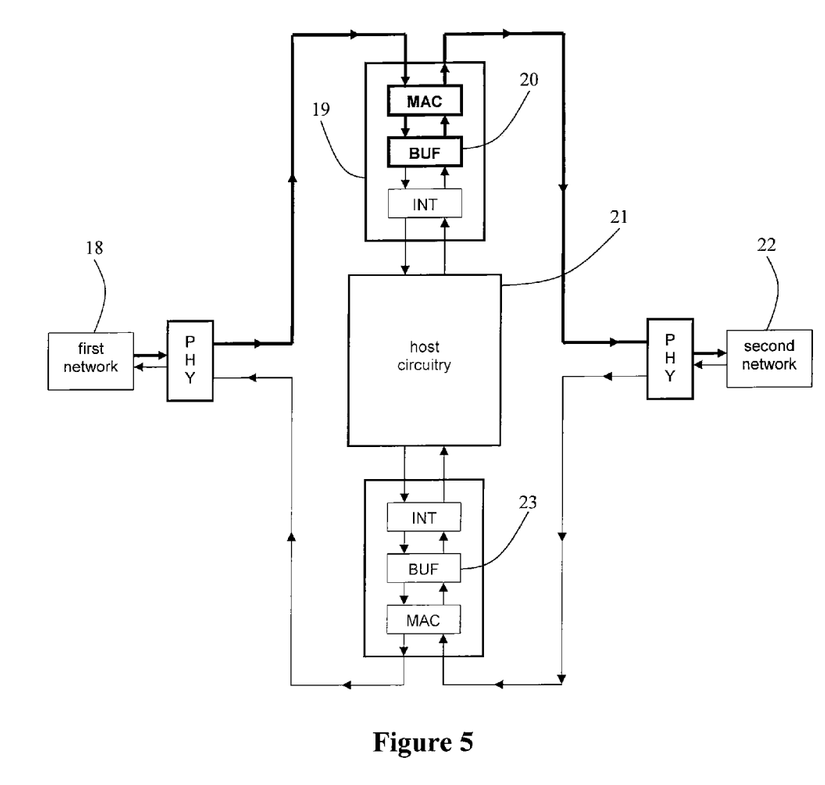
FIG. 5 illustrates the improved data flow of the device in FIG. 4 from a first connected network to a second connected network in a network-connected device configured according to one embodiment.

FIG. 5 highlights the advantage of this embodiment of the current invention. Data is received from network 18 by a network interface 19. Network interface 19 writes that data into its buffer 20 and notifies host circuitry 21 that a packet is available. But now, when that packet is ready for transmission to network 22, it is already in the proper buffer 20 in the proper network interface 19. No costly reads or writes are required. Host circuitry 21 need only tell that same network interface 19 where to find the packet in its buffer 20—using traditional pointer addressing—and network transmission can proceed immediately. The packet is already in buffer 20 of the transmitting interface 19; unlike traditional architectures, the host circuitry 21 is no longer required to copy data from one buffer to another, or from one network interface to another.

The current invention is symmetrical with regards to data direction. The above description with respect to FIG. 5 also applies to data flowing in the opposite direction, from second network 22 to first network 18.

An enormous amount of time is thus saved by not needing to read the packet out of the network interface's buffer and write it into the host circuitry's own memory. Further time is saved by not having to read the packet out of the host circuitry's memory and write it into a second network interface's buffer. Dozens, hundreds, or even thousands of read and write operations—each of which consumes processing cycles and time on the host's relatively slow data buses—are eliminated.

This embodiment of the current invention creates an optimized data path that involves only a single network interface for high-throughput receive and transmit. As noted previously, network interfaces are generally capable of sustaining full network throughput; reductions are caused by outside limitations such as huge quantities of host read and write cycles. By eliminating those outside limitations—by keeping the packet data in a single network interface's buffer—the current invention preserves network speeds and simultaneously reduces the workload on the host circuitry.

This embodiment of the current invention delivers its benefits using traditional network interfaces and traditional host circuitry. High network throughput is accomplished without adding cost and complexity. Existing components already in common use, already enjoying the economies of scale associated with high volume production, and already familiar to those skilled in the art, can be used to achieve the invention's benefits and advantages.

In one example, when forwarding unmodified network data, the host may not need to read, modify, or write the buffer data at all. Such is the function of a device known as a "bridge" that connects two or more networks and permits data to transit between them. The current invention can implement the packet forwarding operation of a bridge with a single pointer operation: Accept the address of a received packet from the receive subsection of the network interface and provide that same address, in that same buffer, to the transmit subsection of that same network interface. In this case, the current invention eliminates 100% of the buffer reads (for the data previously received), host memory writes, host memory reads, and buffer writes (for the data to be transmitted). As shown in the example embodiment of FIG. 5, the current invention accomplishes the forwarding of network data without having to move all of the network data from one network interface to another as required by the traditional architecture of FIG. 3.

For traffic-controlling devices such as routers, switches, bridge-routers (sometimes called "brouters") and the like, wherein decisions such as which received data to forward must be made based upon the network data that was received, the current invention need only read that small portion of the received data in the buffer that is directly associated with routing (such as source or destination address). This is often less than one percent of the total packet size. And as with the previous example, 100% of the data moves are still eliminated because the current invention enables the transmission of the data from the same buffer, and the same location within that buffer, as was used to store the data when it was received. As shown in the example embodiment of FIG. 5, the current invention accomplishes the analysis of network data without having to move all of the network data from one network interface to another as required by the traditional architecture of FIG. 3.

When additions to the received data are required, the current invention can make those additions within the same buffer as was used to store the data when it was received. The new data may be prepended or appended to the existing received data, inserted within the existing received data, or any combination thereof. As shown in the example embodiment of FIG. 5, the current invention adds to network data without having to move all of the network data from one network interface to another as required by the traditional architecture of FIG. 3.

When alterations to the received data are required, the current invention can make those alterations within the same buffer, and in the same location in that buffer, as was used to store the data when it was received. Only the portion that is altered need be operated upon by the host. The current invention saves the time otherwise wasted by traditional network interface architectures when they move the entirety of the data from one buffer to another (often with yet another wasteful intermediate stop in the host's own memory).

Such alterations to forwarded data are commonplace, and some examples may help illustrate the significant value of the current invention in this context. Network Address Translation ("NAT") is the well-known practice of translating network identification values used on one network to a different set, or pattern, of network identification values on another network. A common form of NAT is the translation of Internet Protocol (IP) source and destination addresses when forwarding an IP packet from one subnet to another. IP source and destination addresses are examples of network identification values associated with Layer 3 of the Open Systems Interconnection model.

To effect NAT, a device configured in the traditional manner illustrated in FIG. 3 needs to read the received data from the buffer 9 in the network interface 8 that is connected to the first network (a buffer read), write it into the memory of the host circuitry 10 (a memory write), modify the addressing as necessary within the host circuitry 10 (a modify), read the modified network data from host circuitry 10 (a memory read), and finally write the altered network data into the buffer 11 in the network interface 12 that is connected to the second network (a buffer write).

In stark contrast, the current invention needs none of the buffer reads nor writes required by the traditional architecture to effect NAT. Referring to FIG. 5, once the network interface 19 connected to the first network 18 has received the incoming data into its buffer 20, the host circuitry 21 can simply modify the addressing information in place, within the buffer 20, thus affecting but a small percentage of the total packet. None of the unmodified bits of the network data need to be read, moved, or written. The current invention thus eliminates the vast majority of the reads and writes of the previous paragraph because the current invention's data flow architecture causes the data to already reside in the buffer 20 of the network interface 19 that is connected to the second network 22. In short, the data is already in the proper buffer of the proper network interface. As shown in the example embodiment of FIG. 5, the current invention accomplishes the modification of network data without having to move all of the network data from one network interface to another as required by the traditional architecture of FIG. 3.

Another very common instance of alteration to forwarded data is for "hop count," wherein a data packet maintains a count of the machines through which it has passed on its journey to its intended destination. According to many network protocols, a hop count must be maintained to assist in network operations, troubleshooting, routing decisions, management, and many other functions. This effectively means that every packet received and transmitted by a networked device must be altered, if only to update the hop count.

FIG. 3 serves again to illustrate the inherent inefficiency of the traditional architecture's data path. Every individual data bit of the entire packet must be read from buffer 9, passed through host circuitry 10, and written to buffer 11—with the hop count being updated along the way.

Once more, FIG. 5 shows the dramatically improved efficiency of the current invention. Now, the hop count—which represents a minute fraction of the total packet size—can be updated directly within buffer 20. And then the packet is immediately ready for transmission. Only those bits of the packet that are directly associated with the hop count need be accessed at all. The packet can be received, its hop count updated, and the packet then transmitted entirely within the single buffer 20. The time, throughput, and host processing power wasted by FIG. 3's traditional data path is saved by the current invention.

Note that the current invention delivers its efficiency improvements without sacrificing flexibility. The host can forward data without data analysis or modification. Yet analysis and modification by the host is still possible, and indeed faster than with the traditional architectures already known to those skilled in the art. The host still has the ability to read from and write to the network interface buffers. While the current invention eliminates the requirement to read and write every bit, it does not preclude the option. The host can fully control which, if any, data is forwarded from one network to another. The host can create entirely new data and write it to the buffers to be transmitted. The host can modify received data before it is forwarded, or use received data to make decisions about the operation of the network interfaces or any other aspect of system behavior. Complete flexibility and functionality are thus preserved by the current invention while simultaneously made vastly more efficient.

A key to understanding the advantages of this embodiment of the current invention is that a single network interface, with its single buffer, is now able to completely handle the primary data flow for one direction through a network-connected device. Earlier practices required the movement of data from the receiving network interface's buffer to the transmitting network interface's buffer. The current invention enables the high-speed network data to remain in a single buffer, eliminates the requirement that the data pass over relatively slow host data buses, and eliminates the requirement that the host circuitry and software individually manipulate every data bit.

If the device in question always forwards data from one network to the other and data flow in the other direction is not required, the current invention can actually reduce parts count and complexity as compared to traditional architectures. Instead of requiring two separate network interfaces for each of two ports, the current invention can use a single network interface to receive from one port and transmit to the other—and eliminate the second network interface. FIG. 5 illustrates the data flow of such a configuration. If network data flow is unidirectional (say, from first network 18 to second network 22), all data that flows from first network 18 to second network 22 is handled by interface 19. The traditionally required second interface is no longer necessary because there is no data being received from second network 22 nor transmitted to first network 18.

Comparing the data flow highlighted in the traditional architecture of FIG. 3 with the data flow highlighted in the embodiment of the current invention in FIG. 5 clearly illustrates the differences and advantages of the current invention. In FIG. 3, a single network interface 8 handles both reception from and transmission to the "first" network connection and a separate single network interface 12 handles both reception from and transmission to the "second" network connection. There are two network connections and two network interfaces, and data passing though the device from one network to the other is forced to pass through both network interfaces—and notably, the buffers in both network interfaces.

There are also two network connections and two network interfaces in the embodiment of the current invention shown in FIG. 5. However, the current invention configures these same components very differently. Instead of FIG. 3's configuration of its network interfaces as "one per network connection," FIG. 5's embodiment of the current invention configures the network interfaces as "one per data path". The current invention recognizes that the vast majority of network traffic handled by multiport networked devices passes through the device, and configures the network interfaces to optimize for that fact. In this way, a single network interface—and its single buffer—handles that vast majority of traffic in a manner far more efficient than the traditional architecture of FIG. 3.

Because the current invention can be realized using many standard, off-the-shelf components, it may in some cases be possible to retrofit existing products in the field to take advantage of the current invention by rewiring their components and suitably modifying the host's software. Furthermore, existing designs already in production may be able to take advantage of the current invention in the same way.

For example, an existing device or design with two network interfaces traditionally has the first network interface's input and output associated with a first network, and the second network interface's input and output associated with a second network. Such a device or design may be modified to take advantage of the current invention by disconnecting the output of the first network interface from the first network, disconnecting the output of the second network interface from the second network, connecting the output of the first network interface to the second network, and connecting the output of the second network interface to the first network. In this manner, the first network interface would receive input data from the first network and transmit output data to the second network, while the second network interface would receive input data from the second network and transmit output data to the first network. Such a reconfiguration accomplishes the key aspect of the current invention: Having a single network interface, and its associated buffer, handle the complete data flow path from one network to the other.

The aforementioned embodiment clearly illustrates how the current invention can deliver its dramatic efficiency improvements via an architecture change, with few or even no component changes required. Thus the current invention can minimize the extensive and expensive redesign efforts that are normally necessary to dramatically improve existing products. Engineering schedules, development costs, and time to market can all be reduced by suitable application of the current invention.

Some minor modifications to traditional design practices may be applied when using existing components. For example, some network interfaces employ the concept of a network identification value; in "Ethernet" interfaces, this is known as the Media Access Control or MAC address and is an example of a network identification value associated with Layer 2 of the Open Systems Interconnection model. In previous designs using network interfaces, the MAC address is different for each network port on the device. However, this is an absolute requirement only when multiple ports from a single device are connected to the same subnetwork or collision domain, a rare circumstance that is actively avoided in almost all circumstances. Under normal conditions where each network port is connected to a unique network, the current invention's network interfaces can share a single, common MAC address.

Another consideration is "full duplex" versus "half duplex" network operation. In full duplex environments, the network and connected devices support simultaneous bidirectional communication. This means a device can transmit or receive without regard for "collisions" when multiple devices seek to use the network simultaneously. In contrast, half-duplex environments permit only unidirectional communication, actively monitor for data collisions, and use various algorithms to negotiate solitary access to the common network medium. This embodiment of the current invention using traditional components supports full duplex operation but does not support the collision detection required for half duplex. Fortunately, the goal of the current invention is to optimize for network throughput—and most throughput-sensitive applications use full duplex anyway because of its inherent doubling of network capacity.

Another embodiment of the current invention improves existing network interfaces through the addition of the ability to configure different network identification values for the input and output portions of a single network interface. The ability for the input and output ports of a single network interface to support different network identification values simplifies the architectural considerations associated with half-duplex and its collision detection as described above.

Figure 6:
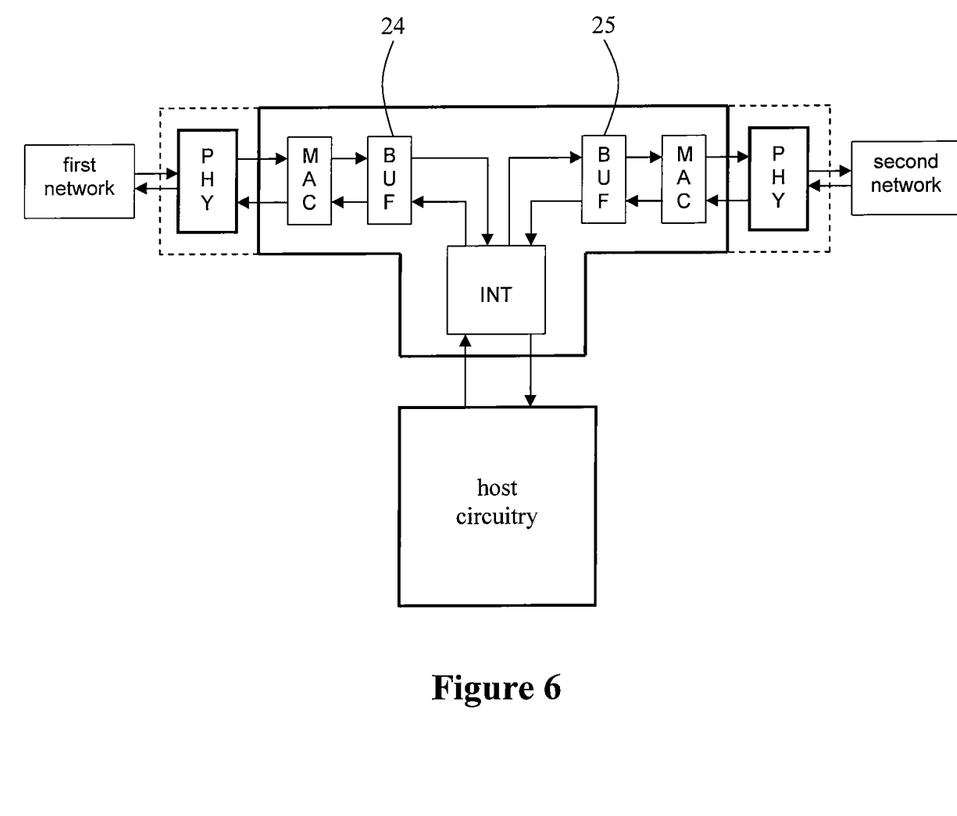
FIG. 6 illustrates a traditionally configured network-connected device with host circuitry and a traditional dual-port network interface according to one embodiment.
Figure 7:
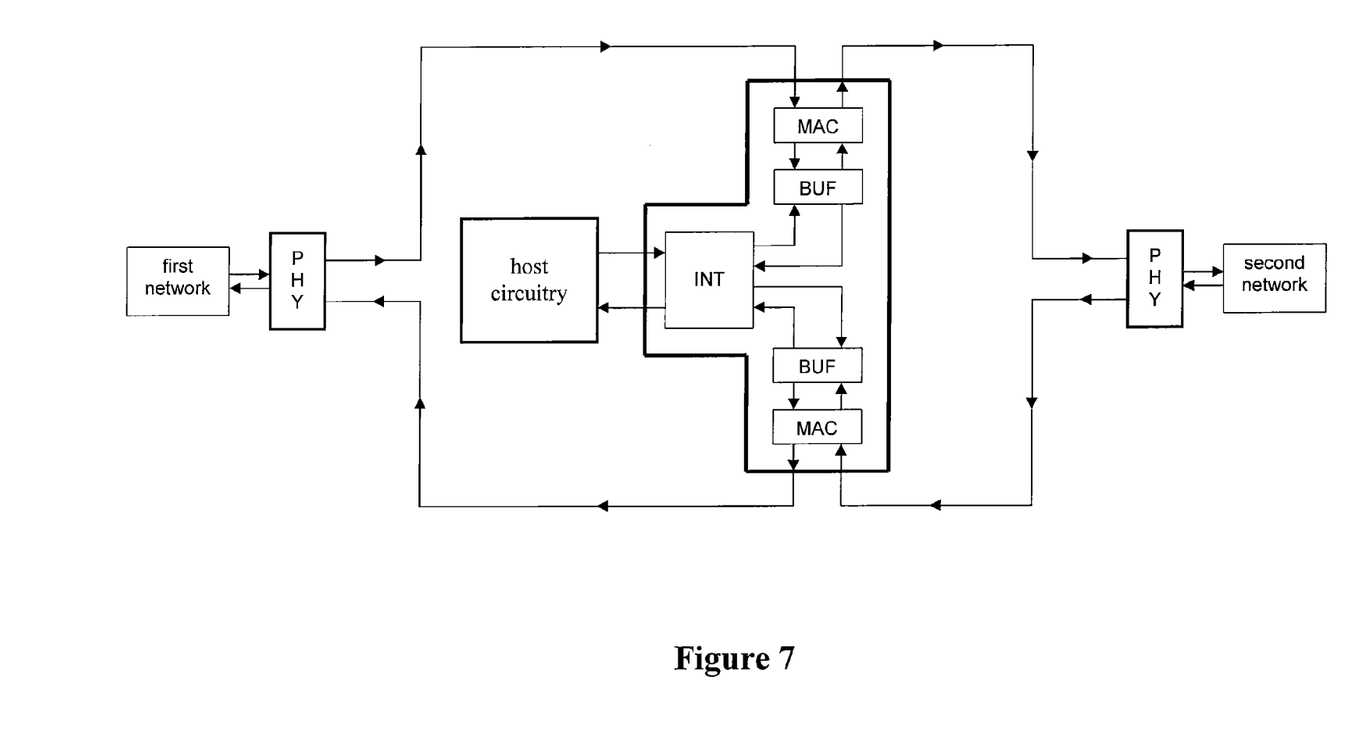
FIG. 7 illustrates a network-connected device configured according to one embodiment of the invention, with host circuitry and a traditional dual-port network interface.

A further embodiment of the current invention improves yet another existing type of network interface. In addition to the "single integrated network interface" used in the narrative above, multiple network interfaces in a single package are widely available. In such designs separate interface subsections are provided for each network connection, while a common INT section is used to interface with the host circuitry. FIG. 6 illustrates how a typical "dual network interface" of this type is often employed in a traditional architecture, while FIG. 7 shows how such a dual network interface with separate buffers could be used without modification in an embodiment of the current invention. Once again, as was illustrated with FIG. 2 and FIG. 4, the current invention can use substantially the same components from FIG. 6 to implement the configuration of FIG. 7. The benefits of off-the-shelf high volume components, and the familiarity and availability that go with them, are preserved. So too are the possibilities of in-the-field upgrades via rewiring and software updates first described with respect to FIG. 2 and FIG. 4.

Figure 8:
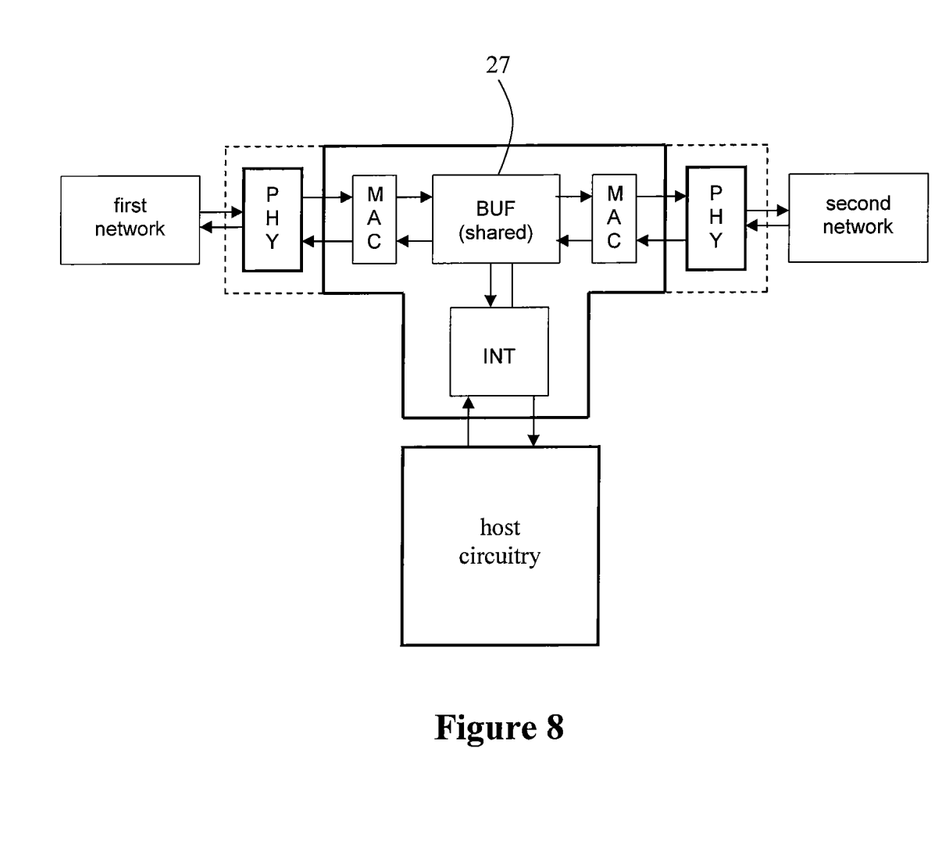
FIG. 8 illustrates a network-connected device with host circuitry, and a dual-port network interface improved according to one embodiment of the invention.

The ability to use standardized components is a significant advantage of the current invention. However, by improving the design of such multiport network interfaces, it is possible to optimize them to take even greater advantage of the current invention—without precluding their use in older, traditional applications. FIG. 8 shows a modified version of the dual port network interface in FIG. 6. Whereas in the typical dual network interface of FIG. 6 separate buffers 24 and 25 are provided for each interface, in FIG. 8 buffers 24 and 25 are combined into a single buffer 27 shared by both interfaces. With this modification, inter-buffer data moves are eliminated in keeping with the current invention.

This embodiment of the current invention can be extended beyond two ports to essentially any number of ports. The key improvement required to bring multi-port network interfaces into compliance with the current invention is to have a single shared buffer into which all received network data is written, from which all transmitted network data is read, and with which the host has access. How each network packet is used can then be managed by the host circuitry with a minimum of control instructions to the network interface IC, without requiring the host circuitry to directly manipulate every bit of network data.

This embodiment of the current invention also addresses the MAC address and half-duplex issues discussed above. With a separate MAC module dedicated to each network port, it becomes possible to have a unique MAC address for each network connection. Likewise, the dedicated MAC modules also permit the use of collision detection and backoff algorithms required for half-duplex operation. Note that the MAC modules themselves need not change from traditional designs; once again, the current invention's ability to yield its benefits with minimal changes to traditional designs and architectures is readily apparent.

A distinction should be drawn between the true multi-port network interfaces being discussed here and multi-port "switch chips" presently on the market. Switch chips have multiple network interfaces and a shared buffer, and automatically transfer packets from one port to another with some degree of autonomy based on the chip's own analysis of the packet contents and internal storage of discovered destination addresses reachable via each connection.

However, as noted these switch chips are intended to operate semi-autonomously and serve primarily as "traffic cops," routing packets without comprehensive analysis or modification of their data. Most importantly, they do not provide the same degree of host access to their internal data buffers as do true network interfaces. Switch chips are intended to have their configuration set by the host, and then to operate more or less autonomously with minimal host interaction upon the network data being received and transmitted. In effect, they sacrifice flexibility to gain high-speed standalone operation.

Switch chips are well known to those skilled in the art. They are valuable in the correct application, but are not compatible with the current invention because they cannot serve as true network interfaces to microprocessors and other intelligent host circuitry. However, if a switch chip were modified into compliance with the current invention, then such a hybrid "interface plus switch" chip could enjoy the benefits described herein while still performing the functions traditionally associated with switch chips.

A variation on the hybrid just described can be realized by connecting a traditional switch chip to one or more true network interfaces that implement the advantages of the current invention. This arrangement could be used to achieve a device that provides some number of specialized "direct access" ports together with some number of semi-autonomous switched ports.

One device, manufactured in the millions annually for home and industrial deployment, is the so-called "wireless router." These relatively inexpensive devices typically have a specialized port for connection to the Internet (often called the "WAN port"), a radio frequency (RF) interface for connection to RF devices, and a series of switched ports for locally connected computers (often called "LAN ports"). Often such routers are implemented as near-single-chip products, which helps lower their manufacturing cost but traps them in the same cost versus performance tradeoff that afflicts switch chips. Network traffic is trapped within the single chip, essentially inaccessible to any microprocessor that may be present in the router.

Alternately, a wireless router can be constructed with traditional network interfaces, using the microprocessor or other host to handle data flow between ports. In this implementation, the host has access to the data—but now the throughput of the device is limited by the bottleneck of the microprocessor. Once again, to increase the speed of the overall product the speed and cost of the microprocessor and all peripheral components must be increased.

These problems may be solved by using the logic of a switch chip with dissimilar network interfaces and a shared buffer per the current invention. In this manner, a low-cost microprocessor may gain direct access to the network data while preserving the high throughput of the overall device. Thus the current invention makes possible a much more powerful and feature-rich router at a lower cost.

Figure 9:
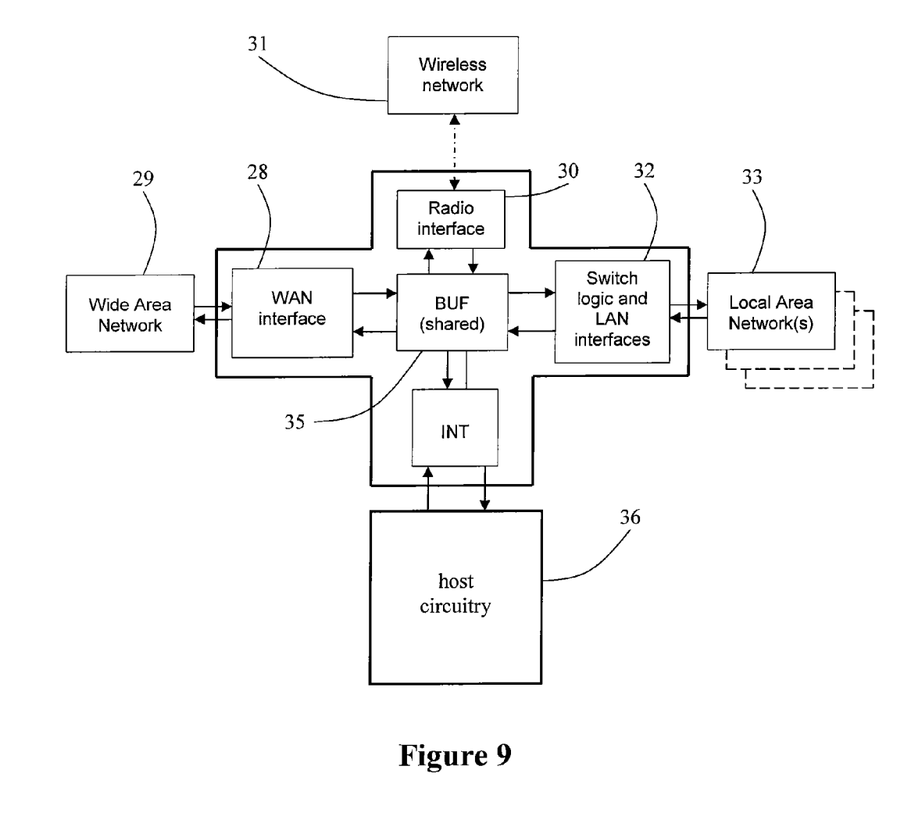
FIG. 9 illustrates a network-connected device with host circuitry, multiple dissimilar network interfaces, and a buffer configuration improved according to one embodiment of the invention.

One such embodiment of the current invention is illustrated in FIG. 9. A Wide Area Network (WAN) interface 28 enables connection to a WAN 29. A radio interface 30 enables connection to a wireless network 31. Semi-autonomous switch logic and multiple Local Area Network (LAN) interfaces 32 enable connection to multiple LAN's. This collection of interfaces mimics that found on many "wireless routers" as described previously.

However, in keeping with the current invention, all interfaces share buffer 35, which is accessible by host circuitry 36. Thus, as with other embodiments of the current invention, in FIG. 9 host circuitry 36 enjoys complete access to and control of network data in buffer 35. This dramatically increases the throughput of the overall system by minimizing unnecessary data movement while preserving the ability of the host circuitry 36 to interact with the network data in any way desired.

A switch chip can provide high throughput via a buffer that is common to its own interfaces, but it lacks full host access to and control of the network data. Discrete interfaces can provide host access to and control of the network data, but at the expense of throughput. In contrast, the current invention delivers the advantages of both.

Another advantage of the current invention is the ability to fundamentally reconfigure a networking device that is compliant with the current invention by updating its software in the field, a practice commonly known as "flashing." As described earlier, existing architectures often rely on fixed hardware when high throughput is desired, sacrificing host access to preserve speed. By making it possible for a software-controlled host to have access to and control of the network data while preserving high throughput, the current invention renders it no longer necessary to rely on fixed hardware for high-speed network data handling. The software that controls the host can control the network data with no throughput penalty, making it possible to correct errors, add features, and perform other useful post-manufacturing changes that prolong the useful life, improve the return on investment, and increase the overall value of devices that implement the current invention.

It is to be understood that the sample embodiments described herein are just a few of the many useful applications of the current invention, and their inclusion here is not meant to limit the applicability of the current invention from other products or fields of practice. As just one example, interfaces for some types of networking mediums such as fiber optic cable and radio frequency (RF, or wireless) cannot currently be reduced to a single component. Fortunately, virtually any type of network interface can be incorporated into an embodiment of the current invention regardless of its construction technique.

In compliance with the statute, the invention has been described in language more or less specific as to structural and methodical features. It is to be understood, however, that the invention is not limited to the specific features shown and described, since the embodiments herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose, and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A system for connecting to communication networks comprising:
   a first network interface integrated circuit comprising an input and an output, both traditionally employed to connect to a first external bidirectional network;
   a second network interface integrated circuit comprising an input and an output, both traditionally employed to connect to a second external bidirectional network;
   the input of the first network interface integrated circuit configured to receive incoming data from the first external bidirectional network;
   the output of the first network interface integrated circuit configured to transmit outgoing data to the second external bidirectional network;
   the input of the second network interface integrated circuit configured to receive incoming data from the second external bidirectional network;
   the output of the second network interface integrated circuit configured to transmit outgoing data to the first external bidirectional network;
   the first network interface integrated circuit further comprises a first buffer, the first network interface integrated circuit being configured to write the incoming data received from the first network into a location in the first buffer, the first network interface integrated circuit being configured to read the outgoing data to be transmitted to the second network from the same location in the first buffer;
   the second network interface integrated circuit further comprises a second buffer, the second network interface intergrated circuit being configured to write the incoming data received from the second network into a location in the second buffer, the second network interface integrated circuit being configured to read the outgoing data to be transmitted to the first network from the same location in the second buffer;
   the first buffer is configured for selective analysis, without modification, of the received data in the first buffer before the first network interface integrated circuit transmits the data to the second network; and
   the second buffer is configured for selective analysis, without modification, of the received data in the second buffer before the second network interface integrated circuit transmits the data to the first network.

2. The system in accordance with claim 1 wherein at least one of the networks is at least one of an optical network, a radio frequency network, or a wired network.

3. The system in accordance with claim 1, wherein:
   the first buffer is configured for selective modification of the received data in the first buffer before the first network interface integrated circuit transmits the data to the second network; and
   the second buffer is configured for selective modification of the received data in the second buffer before the second network interface integrated circuit transmits the data to the first network.

4. The system in accordance with claim 1, wherein:
   the system is configured to selectively write new data in the first buffer to be transmitted by the first network interface integrated circuit to the second network; and
   the system is configured to selectively write new data in the second buffer to be transmitted by the second network interface integrated circuit to the first network.

5. The system in accordance with claim 1, wherein the first and second network interfaces are contained within a single integrated circuit.

6. The system in accordance with claim 5, wherein the first and second buffers comprise a single shared buffer.

7. The system in accordance with claim 1, wherein the input and output of at least one of the network interfaces has dissimilar network identification values.

8. The system in accordance with claim 1, wherein:
the input of the first network interface and the output of the second network interface are configured to use a first network identification value; and
the input of the second network interface and the output of the first network interface are configured to share a second network identification value.

* * * * *